United States Patent [19]

Ohme et al.

[11] 3,795,868

[45] Mar. 5, 1974

[54] APPARATUS FOR THE MEASUREMENT OF RMS VALUES

[75] Inventors: Wolfgang Ohme, Boblingen; Karl Grund, Sindelfingen; Jorg Winkler, Schonaich, all of Germany

[73] Assignee: Hewlett-Packard GmbH, Boblingen, Germany

[22] Filed: July 10, 1972

[21] Appl. No.: 270,115

[30] Foreign Application Priority Data

July 26, 1971 Germany.................. P 21 37 281.6

[52] U.S. Cl................. 328/144, 307/230, 307/261, 324/132
[51] Int. Cl......................... H03k 5/00, G01v 15/00
[58] Field of Search...... 328/26, 142, 144; 324/132; 307/230, 261

[56] References Cited
UNITED STATES PATENTS 3,555,432  1/1971  Ellermeyer............................ 328/26
3,714,570  1/1973  Howell................................ 328/26 X Primary Examiner—John Zazworsky
Attorney, Agent, or Firm—A. C. Smith

[57] ABSTRACT

There is disclosed an apparatus including the ensemble of a squaring means and an averaging means for the continuous measurement of RMS values which is especially useful for acoustical applications. A storage means in an averager is discharged by constant current which results in a linear discharge function of the averager so that quickly following input signals are no longer covered by the exponential discharge characteristic of the prior art detectors of this kind. The input signal is directly supplied to the one input of a multiplier and is supplied to the other input of said multiplier via an operational amplifier which has another multiplier in its feedback in order to increase the dynamic range of the circuitry.

5 Claims, 4 Drawing Figures

APPARATUS FOR THE MEASUREMENT OF RMS VALUES

BACKGROUND OF THE INVENTION

German patent application P1,935,544 discloses a RMS measuring apparatus where the input signal is supplied to the two inputs of a multiplier which is connected with an integrating amplifier having its output signal fed back to the multiplier via a proportional feedback connection. By the direct supply of the input signal to the connected inputs of the multiplier the range of amplitudes on which the circuitry can operate is limited to half the dynamic range of the output circuitry of the multiplier when measuring in logarithmic terms.

In the essay "Hochfrequenztechnik und Elektroakustik," I. Sonntag, Volume 70, 1961, issue 3, pages 75 to 79 there is disclosed another RMS measuring apparatus which is supplied with biased diodes having different breaking points.

U.S. Pat. No. 2,839,244 discloses a multiplying means having two inputs for the signals to be multiplied as well as a divider input.

Furthermore, the squaring means can be constituted of passive or active elements. This is also true for the averager which in its simplest version can comprise an RC combination.

The dissertation essay "Lautstarkemessgerat fur breitbandige und impulshaltige Schalle," Pfeiffer, TH Stuttgart, 1966 discloses mathematical expressions for the response curve of a standard circuitry when it is supplied with squarewave input impulses, provided that the squaring means has an ideal characteristic. In this case the leading edge follows the term $$\sqrt{1 - e^{-t/\tau}}$$

and the trailing edge becomes $$\sqrt{e^{-T/2\tau}}$$

Thus, the charging action is essentially shorter than the discharge action, so that small input signals which immediately follow substantial preceding signals are covered and not indicated by the detector. This disadvantage cannot be eliminated by making the time constant $\tau$ of the detector sufficiently small. The reason is that in this case signals with a constant RMS value but with substantial variations as to the amplitude (for example noise) would result in a variable output instead of the desired constant output.

SUMMARY OF THE INVENTION

The present invention substantially avoids the mentioned disadvantages and provides an RMS measuring apparatus which has improved dynamic properties but still is of simple design.

The novel apparatus for the continuous measurement of approximate RMS values includes a squaring means and averager having an exponential transient characteristic. This averager is connected to said squaring means and has a feedback to the squaring means which feedback effects a division by the value of the output signal of the averager. The averager is discharged by means of a constant current source if and as long as the measured average value is greater than the value corresponding to the instantaneous input signal, where the amplitude of the constant current is proportional to the voltage of the averager upon the start of discharge action. By such a discharge of the averager it is achieved that its voltage decreases linearly and that the total discharge action is always terminated after an unvarying predetermined time interval has elapsed. This discharge action is independent from the level of the voltage at the time the discharge action is initiated. If the time constant of the discharge action is made to be equal to the discharge time constant $2\tau$ of known circuitries the discharge action will now have the form of a tangential to the (no longer existing) exponential function so that there will be no substantial differences compared with the prior art systems as long as the signals have only slight variations.

According to a preferred embodiment of the invention the squaring means is constituted by a device having two multipliers and an operational amplifier. In this case the input signal is directly fed to the one input of a first multiplier and is fed via the operational amplifier to the other input of said multiplier. A second multiplier is provided in a feedback loop of the operational amplifier. The amplification and thus the signal at the output of the first amplifier is inversely proportional to a signal at the input of the second multiplier. This free input of the second multiplier serves as divider input and is connected with the output of the averager.

This circuitry has the additional advantage that the first multiplier serving as a squaring means is supplied with a signal which is already divided by the average value so that the voltage level of the signals at the input is decreased. This circuitry is generally of advantage in RMS measuring devices.

DESCRIPTION OF THE PREFERRED EMBODIMENTS

Figure 1:
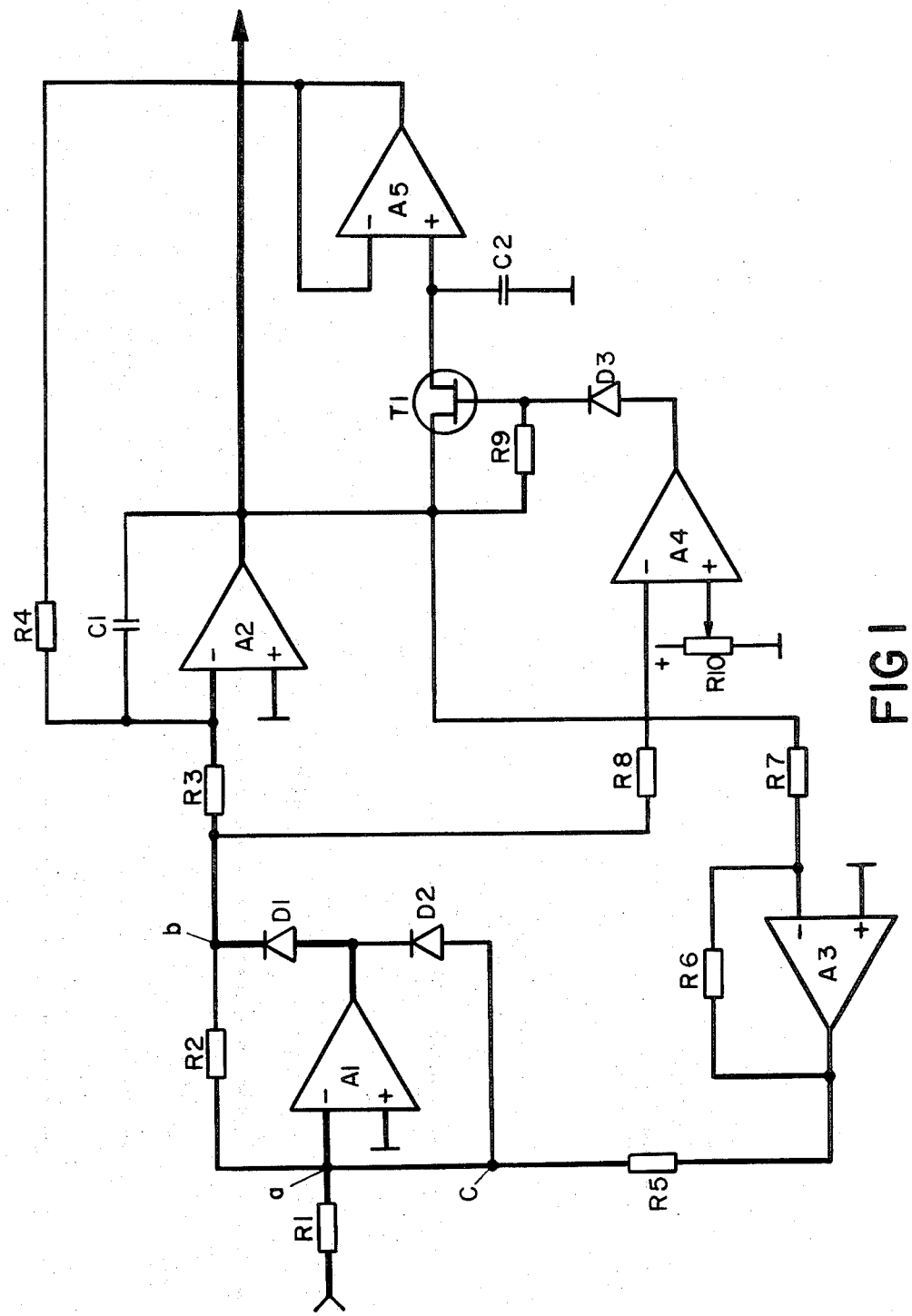
FIG. 1 is a diagram of a circuit for measuring RMS values according to the invention.

According to FIG. 1 the input signal is supplied to an operational amplifier A1 via a summation resistor R1. The operational amplifier A1 is provided with diodes D1 and D2 as well as with a feedback resistor R2 whereby a half wave rectifier with an ideal characteristic is constituted. Between the output of the rectifier, i.e., between the feedback resistor R2 and the feedback diode D1 there is connected an input resistor R3 of an integrating amplifier A2. This integrating amplifier is provided with a resistor R4 and an integrating capacitor C1 and these elements constitute an averager. The output of the integrating amplifier A2 is supplied to the operational amplifier A1 via an operational amplifier A3 and a summation resistor R5. The operational amplifier A3 is provided with feedback and input resistors R6 and R7, respectively. The circuitry thus described is similar to the prior art circuits.

A comparator A4 is connected with the output of the idealized diode via a resistor R8. The output of the comparator A4 is supplied to the gate electrode of a field effect transistor T1 via a diode D3. The transistor T1 is connected to the output of the amplifier A2 and to a capacitor C2. The output of the integrating amplifier A2 is connected with the gate electrode of the field effect transistor via a resistor R9. The capacitor C2 is connected to the non-inverting input of an amplifier A5 which constitutes an emitter follower. The output of this amplifier is connected with the input R4 of the averager.

This circuitry operates in the following manner:

The input ac voltage is supplied to the amplifier A1 via the summation resistor R1. The amplifier A1 operates as a half wave rectifier which in this embodiment approaches a square characteristic by a conversion curve having only one breaking point. However, it will become obvious that the desired parabolic curve shape can be approached more exactly, for example by using a squaring circuitry according to FIG. 2 instead of the half wave rectifier of FIG. 1. The rectified signal from the idealized diode is supplied to the integrating amplifier A2 and will charge the integrating capacitor C1. During this charging action the sampling transistor T1 is conductive so that the voltage at the capacitor C2 will, without any essential delay, follow the instantaneous value of the voltage of the capacitor C1. Thus, the resistor R4 will act as if it were parallel to the capacitor C1, i.e., it will support the desired exponential charge action. The output voltage of the integrating amplifier A2 is fed back to the summation input of the idealized diode via the inverting amplifier A3. Thereby the characteristic curve of the idealized diode and its breaking point are shifted. This shifting will in a known per se manner provide a division of the squared signal by the output voltage of the integrating amplifier.

As soon as the diode D1 will become non-conductive and thus point b will become more negative than the reference potential which is adjusted at the resistor R10, the comparator A4 will switch and will block the field effect transistor T1 so that the capacitor C2 will store the output voltage which is present at the integrator at the switching moment. The constant discharge current being defined by the voltage of the capacitor C2 and the value of the feedback resistor R4 will effect a linear discharge of the voltage of the integrating capacitor C1, until the field effect transistor will be activated again by a positive voltage at the output of the idealized diode. At this moment the instantaneous value of the voltage of the capacitor C1 will be supplied to the capacitor C2.

Consequently each input amplitude within the linear range of the elements will be measured within a constant time interval while with the prior art circuitries for measuring RMS value the discharge action of the averager was only performed with about 4.3 db per time constant. The discharge time is for example $2\tau$, while the charge action will still follow the formula $$\sqrt{1 - e^{-t/\tau}}$$

provided there are supplied square wave impulses to the circuitry.

Figure 2:
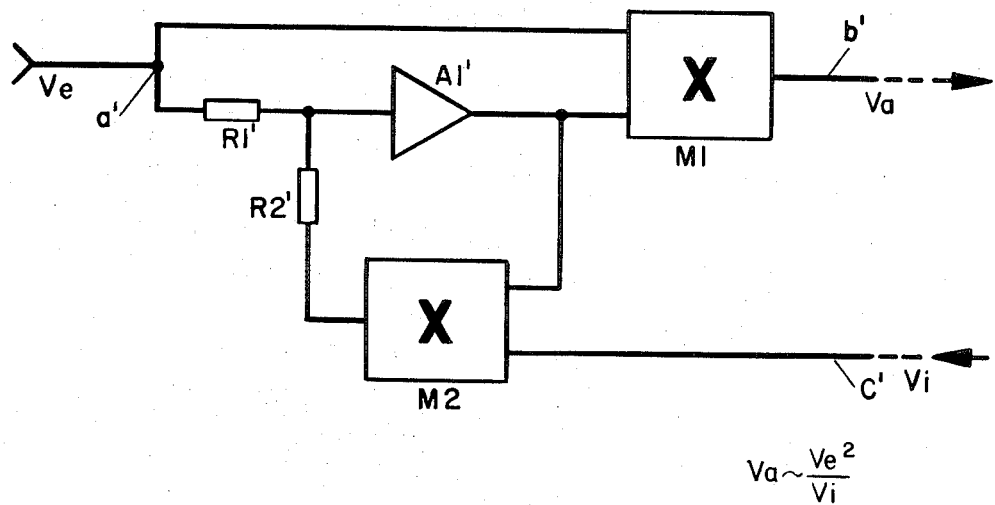
FIG. 2 is a diagram of a preferred circuitry constituting a multiplier having an increased dynamic range.

According to the diagram of FIG. 2 the idealized diode between the junctions $a$, $b$, $c$ can be replaced by a circuitry including two multipliers. This squaring means comprises a first multiplier M1 which serves as the proper squaring means. The input signal is directly fed to the one input of said multiplier M1 and is fed to the other input of said multiplier via an operational amplifier A1 having a controllable gain. The gain can be controlled by the second multiplier M2 in the feedback loop of the operational amplifier in connection with the resistor R1 and R2 by supplying a dc voltage to the free input of the second multiplier M2. There is a reciprocal relation between said dc voltage on the one hand and the gain and thus the voltage at the output of the multiplier M1 on the other hand.

The main advantage of this circuitry is that there is a smaller dynamic range at the output of the multiplier M1 than the usual multipliers with which the signals to be multiplied are directly supplied to the multiplier. In contrast to the prior art the one input of the multiplier M1 receives a signal which is already divided by the value of the output signal of the averager. Thus, the additional provision of a multiplier brings along the advantage that after the transient time of the circuitry the range of voltage levels at the input of the first multiplier M1 is substantially decreased. This will result in a considerable improvement of the square characteristic of the RMS measuring apparatus.

Figures 3A, 3B:
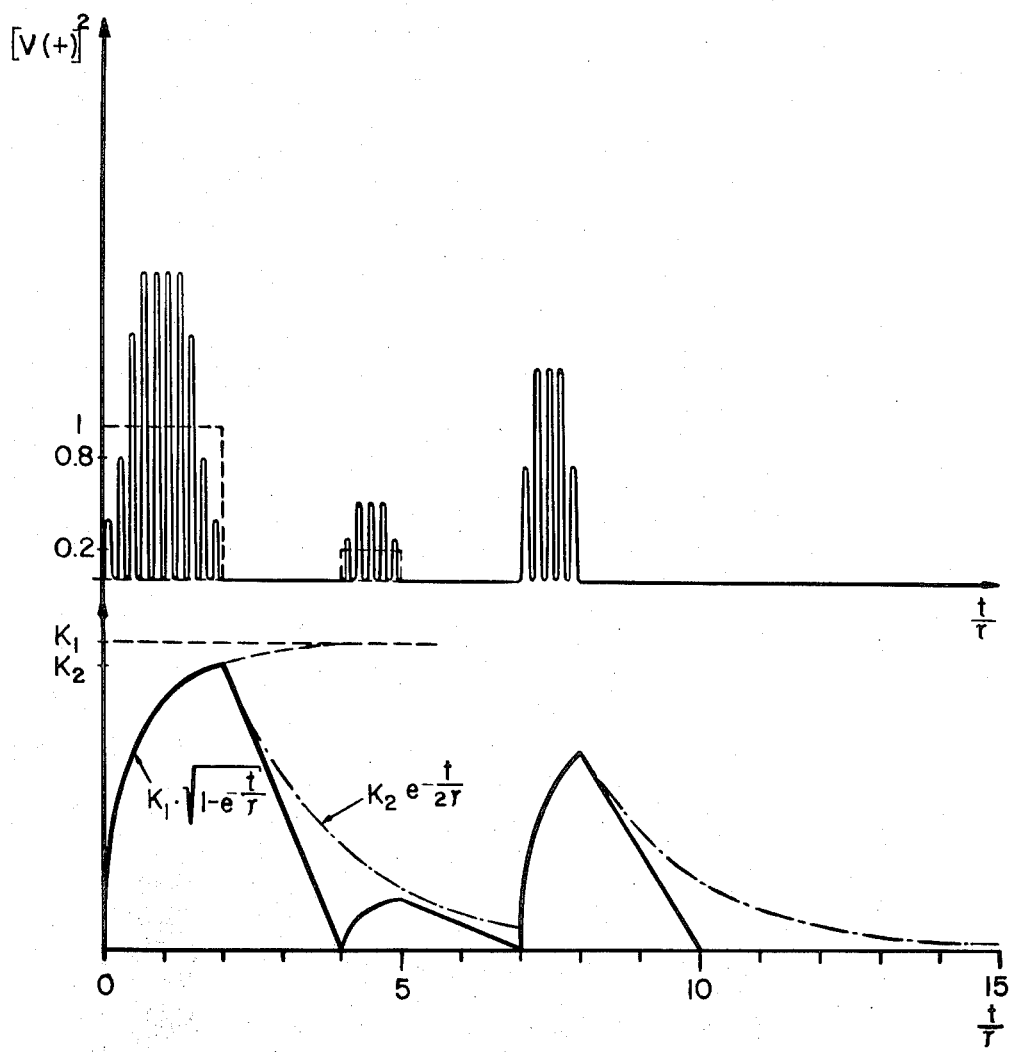
FIG. 3a is a schematic diagram of a voltage signal to be measured, for example the noise generated by the strokes of a typewriter.
FIG. 3b illustrates in dotted lines the obscured indication of a known RMS measuring apparatus, while the continuous lines illustrate the improved display achieved by the circuitry according to the invention.

In FIG. 3a a typical input signal and its envelope are illustrated. The illustrated input signal can be representative for a voltage curve derived from the noise pressure levels generated by the stroke of a typewriter.

The dotted lines of FIG. 3b show the response of prior art RMS meters. The leading edge as well as the trailing edge of the response has an exponential waveform and the discharge time constant or the trailing edge time constant is greater than the constant of the leading edge. It can be taken from the figure that with the special illustrated input signal the second typewriter stroke is completely covered by the exponential function of the preceding stroke so that the RMS value of the second stroke is not measured.

However, the solid curve of FIG. 3b illustrates that the trailing edge of the response function of the measuring apparatus according to the invention decreases linearly to zero in a time interval of two time constants, where the response curve due to the second typewriter stroke is no longer obscured. Thereby a decisive improvement of the dynamic properties of RMS meters is achieved which will especially work out with short signals having high amplitudes.

We claim:

1. Apparatus for the continuous measurement of approximate RMS values of an input signal, the apparatus comprising signal squaring means, an averager connected to said squaring means and having an energy-storage element that provides an exponential transient characteristic, negative feedback means connecting said averager to the signal squaring means for providing signal division in proportion to the value of the output signal of the averager, source means of constant current connected to said averager for selectively discharging the energy-storage element thereof with a substantially constant current during the period that the output of the averager is greater than a value indicative of the instantaneous input signal, said source means supplying said substantially constant current with an amplitude that is proportional to the output of the averager upon the start of the discharge action.

2. The apparatus as in claim 1 wherein the squaring means includes a pair of multipliers each having a pair of inputs, means applying input signal to one input of one of the multipliers, an operational amplifier including a feedback circuit connected to apply the input signal to the other input of said one of the multipliers, said feedback circuit of said operational amplifier including the output and one input of the other of said multipliers, the other input thereof being connected to the output of the averager.

3. The apparatus according to claim 1 wherein the averager comprises an operational amplifier including capacitive feedback for operating as an integrating amplifier, and said source means is connected through a resistor for discharging the integrating amplifier.

4. The apparatus according to claim 3 wherein said source means includes signal-controlled switching means connected between the output of the integrating amplifier and said resistor, and a signal level comparator connected to compare the output of the squaring means with a reference potential for activating the switching means for the period during which the output potential of the squaring means is greater than the reference potential and for deactivating the switching means in response to the output of the squaring means attaining a value smaller than said reference potential, said source means supplying discharging current through said resistor to said integrating amplifier in response to deactivation of said switching means.

5. The apparatus as in claim 1 wherein said source means supplies said discharge current at a value substantially equal to the initial value of discharge current associated with an exponential discharge which would result without a constant current discharge.

* * * * *

UNITED STATES PATENT OFFICE
CERTIFICATE OF CORRECTION

Patent No. 3,795,868         Dated March 5, 1974

Inventor(s) Wolfgang Ohme, Karl Grund, Jorg Winkler

It is certified that error appears in the above-identified patent and that said Letters Patent are hereby corrected as shown below:

Column 1, in the second equation, lines 39-40, cancel "$-T/2\tau$" and substitute -- $-t/2\tau$ --.

Signed and sealed this 9th day of July 1974.

(SEAL)
Attest:

McCOY M. GIBSON, JR.          C. MARSHALL DANN
Attesting Officer             Commissioner of Patents